United States Patent [19]

Slaght

[11] 4,396,233

[45] Aug. 2, 1983

[54] TRACK FOR ROPE VEHICLE

[75] Inventor: William F. Slaght, Ste-Foy, Canada

[73] Assignee: Her Majesty the Queen in right of Canada as represented by the Minister of National Defence, Ottawa, Canada

[21] Appl. No.: 206,660

[22] Filed: Nov. 13, 1980

[30] Foreign Application Priority Data

Jan. 29, 1980 [CA] Canada .................................. 345356

[51] Int. Cl.³ ...................... B62D 55/02; B62D 55/24
[52] U.S. Cl. .................................. 305/35 R; 305/52; 305/54; 305/57
[58] Field of Search ............ 305/15, 33, 35 R, 35 EB, 305/36, 39, 44, 52, 54, 57, 60; 198/779, 835, 833, 688, 648; 180/6.7, 9.22, 9.38, 9.32

[56] References Cited

U.S. PATENT DOCUMENTS

| 2,751,259 | 6/1956 | Bonmartini | 305/52 X |
| 3,253,692 | 5/1966 | Ota | 198/835 X |
| 3,439,425 | 4/1969 | Doxey et al. | 305/52 X |
| 3,872,940 | 3/1975 | Gambini | 305/52 X |
| 4,281,882 | 8/1981 | Van Der Lely | 305/544 |

FOREIGN PATENT DOCUMENTS 626594 7/1949 United Kingdom ............ 305/35 R

Primary Examiner—Charles A. Marmor
Attorney, Agent, or Firm—Stevens, Davis, Miller & Mosher

[57] ABSTRACT

An endless track particularly useful in conjunction with a light-weight track vehicle. The novel track includes endless belt and a plurality of cleats fastened to and spaced about the endless belt. The cleats include rollers to provide the vehicle with agility, ease of operation and reduced turning power.

9 Claims, 2 Drawing Figures

TRACK FOR ROPE VEHICLE

CROSS-REFERENCE TO RELATED APPLICATION

The subject matter of this application is related to that of applicant's co-pending U.S. Pat. No. 4,242,036, the disclosure of which is incorporated herein by reference.

BACKGROUND OF THE INVENTION

The present invention relates to an endless track design particularly useful in conjunction with the light-weight track vehicle described in the aforementioned U.S. Pat. No. 4,242,036.

Such vehicles when equipped with closed circuit television cameras can enter buildings or the like filled with gas or which are structurally dangerous and seek out, via remote operator control, injured people. The vehicle is relatively inexpensive and can therefore be employed to disrupt improvised explosive devices. The vehicle is also capable of negotiating obstacles such as stairs by means of a pivoting obstacle hook which cams the front of the vehicle onto the obstacle so that the obstacle will be engaged by the track.

SUMMARY OF THE INVENTION

According to the invention, an endless track for a track vehicle is contemplated, comprising endless belt means; and a plurality of cleat means fastened to and spaced about said endless belt means, each of said cleat means including roller means oriented for rotation about an axis parallel to the longitudinal axis of said endless belt. Preferably, the leading edge of the cleats include a rubber surfaced traction increasing area for improved obstacle scaling ability and twin rollers for enhanced turning mobility.

BRIEF DESCRIPTION OF THE DRAWING

In the drawings which serve to illustrate embodiments of the invention.

DESCRIPTION OF THE PREFERRED EMBODIMENT

Figure 1:
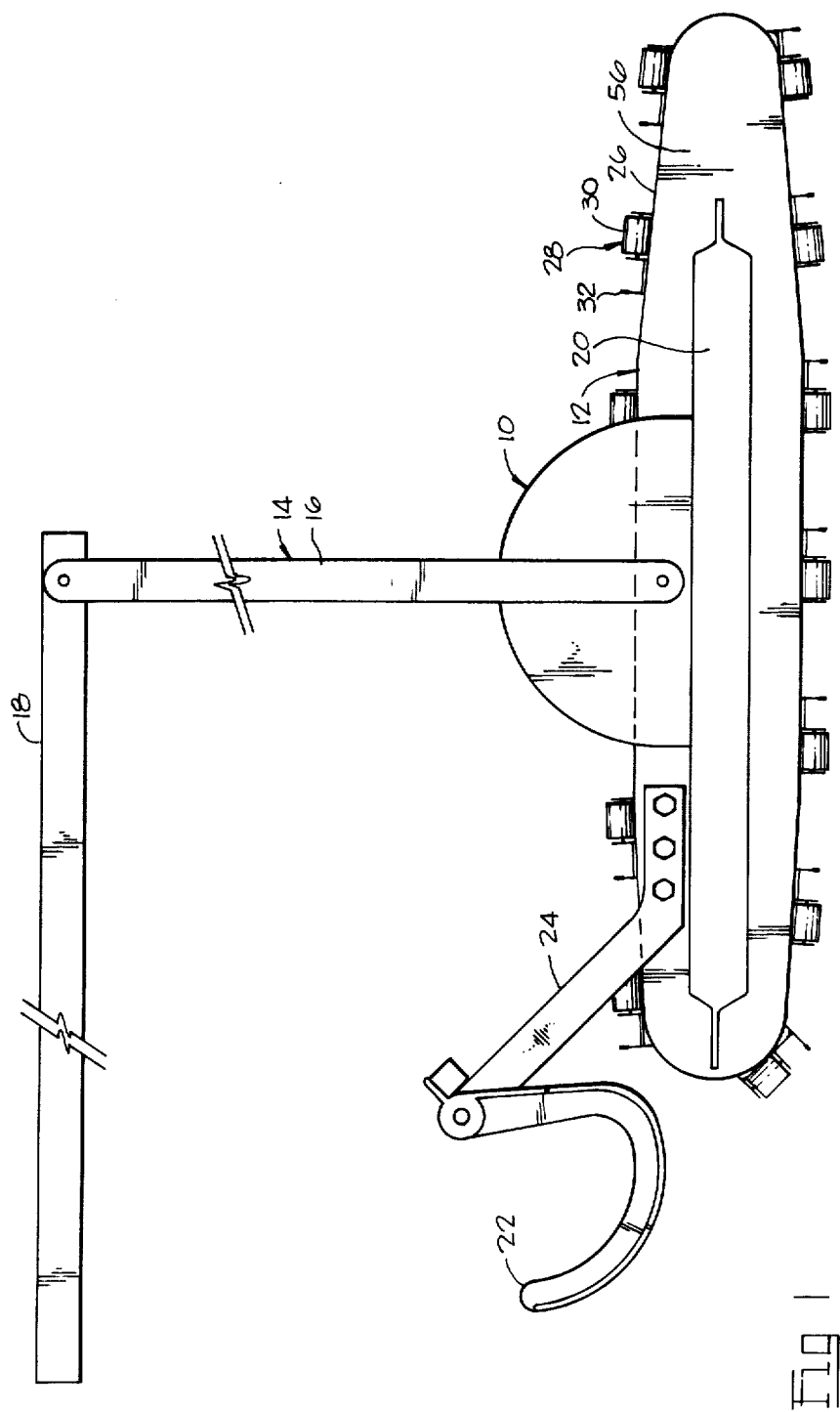
FIG. 1 is a side elevation of a track vehicle employing an endless track according to the invention.

In FIG. 1, a light-weight track vehicle 10 is illustrated, including an endless track 12 according to the invention. A pivoting equipment positioning boom assembly 14 including a powered primary beam 16 and a load carrying secondary beam 18 is mounted on the deck 20 of the vehicle. Disruptors or equipment (not shown) requiring on site emplacement are carried by the secondary beam 18. Two forwardly extending obstacle hooks 22 for camming the front of the vehicle 10 onto obstacles consisting of two extruded plastic, free-pivoting hook-shaped constructions are secured at each side of the vehicle by projecting bracket arms 24.

Figure 2:
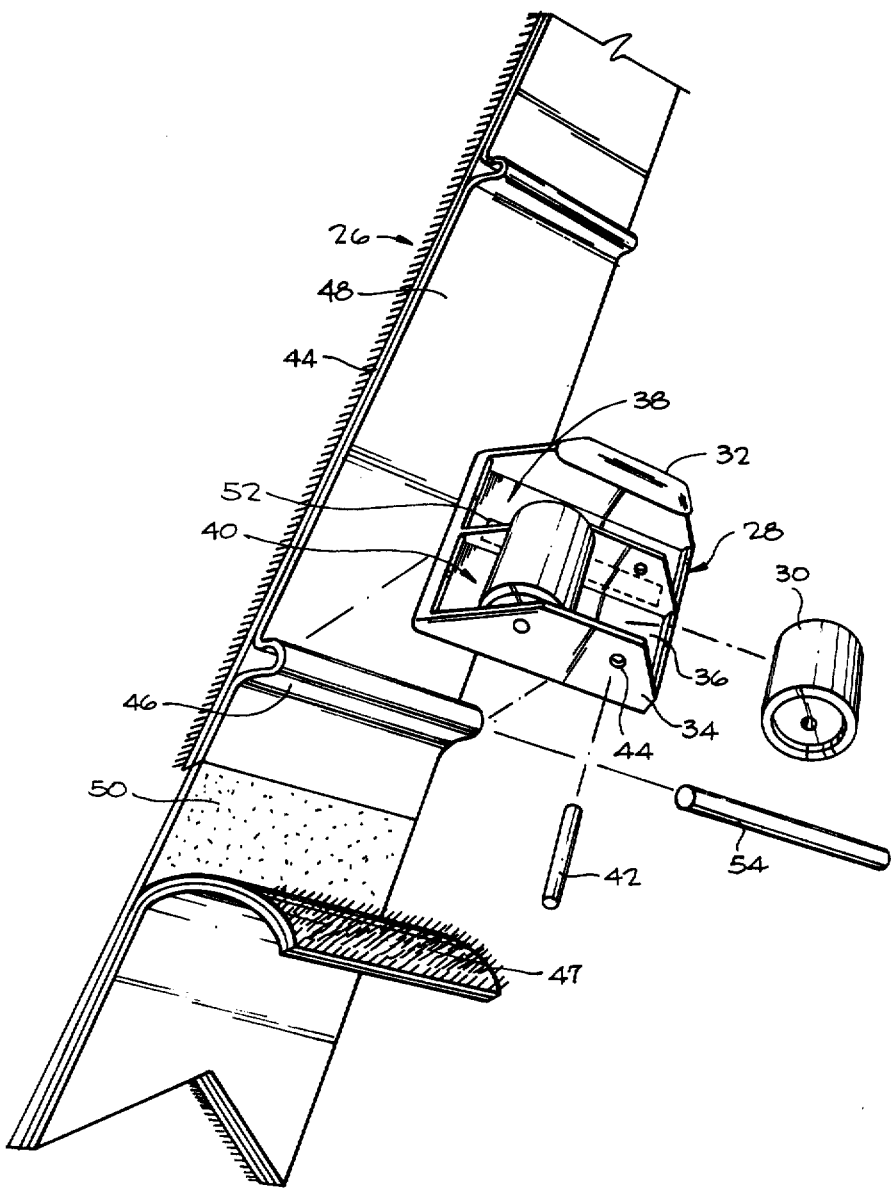
FIG. 2 is a perspective view of a portion of a track assembly according to the invention.

As best seen in FIG. 2, the endless track 12 includes an endless belt means 26 and a plurality of cleat means 28 fastened to and equally spaced about the endless belt means 26.

Each of the cleat means 28 includes roller means 30 oriented for rotation about an axis parallel to the longitudinal axis of the endless belt means 28, to provide agility, ease of operation and reduced turning power, and a traction increasing rubber pad 32.

The cleat means 28 is in the form of an E-shaped body of a suitable hard plastics material, including a base 36 and three upstanding trapezium-shaped flanges 34 integral with the base and defining leading and trailing compartments 38 and 40, respectively. The traction increasing pad 32 is transverse to roller 30 and attached to the free end of the leading flange 34 and the roller means 30 is located in the trailing compartment 40.

The roller means 30 comprises a pair of spaced, horizontally aligned rubber surfaced rollers 30 extending somewhat proud of the free ends of the flanges 34 such that the rollers 30 and pad surface 32 are in substantially the same plane. The rollers 30 are pivotally mounted on axles 42 carried in suitable openings 44 in the flanges 34.

The endless belt means 26 includes an inner layer of a hook and loop fastening material such as Velcro ® 47 and an outer layer of the same length as the inner layer bonded thereto e.g. by adhesive means. The outer layer comprises a length 48 of a suitable strong flexible material such as nylon and butted thereto, a short length 50 of Velcro ®. The opposing free ends of the bonded layers are overlapped to connect the Velcro ® portions 47 and 50 to form the endless belt means 26.

The nylon portion 48 of the outer layer includes a plurality of substantially equally spaced upstanding loop means 46 and the cleat base 36 includes a central transverse opening 52, such that the loop means 46 extends through the opening 52. A wedge means in the form of a dowel 54 is forcefit into the threaded loop 46 to fasten the cleat means 28 to the endless belt 26.

The assembled endless belt means 26 thus provides an exposed inner layer of Velcro ® for positive engagement with an attaching Velcro ® surface on the drive drum 56. Thus, should the endless belt means become damaged or broken, it may simply be replaced. Since the cleats are easily removed, they can be quickly transferred to a new endless belt.

It will be appreciated that although the trademark Velcro ® has been employed throughout, other hook/loop fastening materials are also contemplated. It will also be appreciated that the locations of the hook and loop materials may be reversed.

In view of the preferred embodiments described above, it will be apparent to those skilled in the art that the present invention may be embodied in forms other than those specifically described without departing from the spirit or central characteristics of the invention. Thus, the specific embodiments described above are to be considered in all respects as illustrative and by no means restrictive.

The embodiments of the invention in which an exclusive property or privilege is claimed are defined as follows:

1. An endless track for a track vehicle, comprising: endless belt means; and
   a plurality of cleat means fastened to and spaced about said endless belt means, each of said cleat means including roller means oriented for rotation about an axis parallel to the longitudinal axis of said endless belt and traction increasing elastomeric pad means mounted transversely and forwardly of said roller means, said endless belt means comprising an inner layer of hook-loop-type fasteners and an outer layer bonded thereto, said outer layer including a length of a suitable strong flexible material and a short length of complementary hook-looptype fasteners, said inner and outer layers being the same length, wherein the opposing free ends of said bonded layers are overlapped to connect said hook-loop-type portions to form said endless belt means.

2. An endless track according to claim 1, wherein said cleat means is in the form of an E-shaped body including a base and three upstanding flanges integral with said base and defining leading and trailing compartments, wherein said pad is attached to the free end of the leading flange and wherein said roller means is located in said trailing compartment.

3. An endless track according to claim 2, wherein said roller means comprises a pair of horizontally aligned rubber surfaced rollers extending somewhat proud of the free ends of said flanges such that the roller surface and the pad surface are in substantially the same plane.

4. An endless track according to claim 3, wherein said upstanding flanges are trapezium shaped.

5. An endless track according to claim 1, wherein said outer layer includes a plurality of substantially equally spaced upstanding loop means and wherein the base of said cleat means includes a central transverse opening, such that said loop means extends through said opening and further comprising wedge means for retaining said loop means in said opening to fasten said cleat means to said endless belt means.

6. An endless track according to claim 1 or 5, wherein said strong flexible material is nylon.

7. An endless track according to claim 1, 2 or 5, wherein said cleat means are constructed of a suitable hard plastics material.

8. An endless track according to claim 1, 2 or 5, wherein said cleat means are constructed of polycarbonate.

9. An endless track according to claim 1 in which the pads are mounted stationary in relation to the rollers.

* * * * *